(12) United States Patent
Vahle et al.

(10) Patent No.: US 12,191,703 B2
(45) Date of Patent: Jan. 7, 2025

(54) WIRELESS MOBILE BATTERY

(71) Applicants: William Vahle, Lenox, MA (US); Lukas Scheurer, Providence, RI (US)

(72) Inventors: William Vahle, Lenox, MA (US); Lukas Scheurer, Providence, RI (US)

(*) Notice: Subject to any disclaimer, the term of this patent is extended or adjusted under 35 U.S.C. 154(b) by 0 days.

(21) Appl. No.: 18/075,047

(22) Filed: Dec. 5, 2022

(65) Prior Publication Data
US 2023/0097239 A1 Mar. 30, 2023

Related U.S. Application Data

(63) Continuation of application No. 16/531,060, filed on Aug. 3, 2019, now Pat. No. 11,522,382, which is a
(Continued)

(51) Int. Cl.
*H02J 7/34* (2006.01)
*H02J 50/10* (2016.01)
(Continued)

(52) U.S. Cl.
CPC ............. *H02J 7/342* (2020.01); *H02J 50/10* (2016.02); *H02J 50/23* (2016.02); *H02J 50/40* (2016.02); *H02J 50/80* (2016.02); *H04W 4/80* (2018.02)

(58) Field of Classification Search
USPC ........................................................ 320/108
See application file for complete search history.

(56) References Cited

U.S. PATENT DOCUMENTS

D306,583 S    3/1990   Krolopp et al.
D380,199 S    6/1997   Beruscha et al.
(Continued)

FOREIGN PATENT DOCUMENTS

CN    110932417 A    3/2020
CN    110994810 A    4/2020

OTHER PUBLICATIONS

[No Author Listed] "Introducing Charge Force wireless power," uploaded on May 31, 2016, Retrieved from the Internet at <https://www.youtube.com/watch?v=RxR9HaulPUU> on Mar. 22, 2023, 1 page.
(Continued)

*Primary Examiner* — Bryce M Aisaka
(74) *Attorney, Agent, or Firm* — Nutter McClennen & Fish LLP

(57) ABSTRACT

A charging device for wirelessly charging an electronic device has a wireless power receiver antenna. The charging device includes a battery having a front surface and a back surface. The charging device has a first antenna comprising a wireless power transmit antenna or a dual-mode antenna. The first antenna is configured to wirelessly transmit power. The charging device has a second antenna. The second antenna includes a wireless power receiver antenna or a dual-mode antenna. The first antenna is configured to wirelessly receive power. The charging device also includes a housing encapsulating the battery, the first antenna, and the second antenna. The housing has a front contact surface opposed to a rear surface, and the contact surface has a coupling portion configured to couple the charging device with the electronic device. The first antenna is closer to the contact surface, and the second antenna is closer to the rear surface.

22 Claims, 10 Drawing Sheets

Related U.S. Application Data continuation-in-part of application No. 29/666,864, filed on Oct. 16, 2018, now Pat. No. Des. 924,797, and a continuation-in-part of application No. 29/664,014, filed on Sep. 20, 2018, now Pat. No. Des. 884,618.

(60) Provisional application No. 62/714,640, filed on Aug. 3, 2018.

(51) Int. Cl.
  *H02J 50/23* (2016.01)
  *H02J 50/40* (2016.01)
  *H02J 50/80* (2016.01)
  *H04W 4/80* (2018.01)

(56) References Cited

U.S. PATENT DOCUMENTS

| | | | |
|---|---|---|---|
| D396,686 S | 8/1998 | Bay et al. | |
| D518,451 S | 4/2006 | Nussberger et al. | |
| 7,294,431 B2 | 11/2007 | Puttaiah et al. | |
| D566,657 S | 4/2008 | Shen et al. | |
| D599,736 S | 9/2009 | Ferber et al. | |
| D611,899 S | 3/2010 | Yang | |
| D636,724 S | 4/2011 | Nomi et al. | |
| D639,734 S | 6/2011 | Ferber et al. | |
| D645,045 S | 9/2011 | Cacioppo et al. | |
| 8,193,764 B2 | 6/2012 | Jakubowski | |
| 8,560,024 B2 | 10/2013 | Beart et al. | |
| D697,473 S | 1/2014 | Guccione et al. | |
| 8,829,724 B2 | 9/2014 | Ryu et al. | |
| D722,043 S | 2/2015 | Requa | |
| 8,981,598 B2 | 3/2015 | Azancot et al. | |
| D729,163 S | 5/2015 | Meyer | |
| D762,168 S | 7/2016 | Sandoval et al. | |
| 9,548,796 B2 | 1/2017 | Teggatz et al. | |
| 9,553,476 B2 | 1/2017 | An et al. | |
| 9,582,748 B2 | 2/2017 | Proud et al. | |
| 9,647,484 B2 | 5/2017 | Wu et al. | |
| D791,767 S | 7/2017 | Ali et al. | |
| D795,184 S | 8/2017 | Jung et al. | |
| 9,768,637 B2 | 9/2017 | Kwon et al. | |
| 9,906,067 B1 | 2/2018 | Garrity et al. | |
| 9,916,925 B2 | 3/2018 | Seo et al. | |
| D816,049 S | 4/2018 | Kim | |
| 10,090,884 B2 | 10/2018 | Ettes et al. | |
| D832,782 S | 11/2018 | Leabman | |
| 10,147,538 B2 | 12/2018 | Huang et al. | |
| 10,192,665 B2 | 1/2019 | Breiwa et al. | |
| 10,312,719 B2 | 6/2019 | Files et al. | |
| 10,505,401 B2 | 12/2019 | Yang et al. | |
| 10,566,133 B2 | 2/2020 | Hui et al. | |
| D884,618 S | 5/2020 | Vahle et al. | |
| D897,975 S | 10/2020 | Lanter, Jr. | |
| 11,011,942 B2 | 5/2021 | Liu | |
| D924,797 S | 7/2021 | Scheurer et al. | |
| 11,114,885 B2 | 9/2021 | Hosseini et al. | |
| 11,190,035 B2 | 11/2021 | Sobh | |
| 11,289,936 B2 | 3/2022 | Yang et al. | |
| 11,368,055 B2 | 6/2022 | Ye et al. | |
| 11,522,382 B1 | 12/2022 | Vahle et al. | |
| 2013/0260677 A1 | 10/2013 | Partovi | |
| 2013/0300351 A1 | 11/2013 | Gu et al. | |
| 2015/0333562 A1 | 11/2015 | Nam et al. | |
| 2016/0094076 A1 | 3/2016 | Kasar et al. | |
| 2016/0094078 A1 | 3/2016 | Graham et al. | |
| 2016/0172870 A1 | 6/2016 | Blum et al. | |
| 2016/0261133 A1 | 9/2016 | Wang | |
| 2016/0294225 A1* | 10/2016 | Blum | H02J 7/342 |
| 2016/0301241 A1 | 10/2016 | Cho et al. | |
| 2016/0380464 A1* | 12/2016 | Chin | H02J 50/80 |
| | | | 320/108 |
| 2017/0133862 A1 | 5/2017 | Jung et al. | |
| 2017/0288445 A1 | 10/2017 | Lee et al. | |
| 2017/0373522 A1 | 12/2017 | Pelosi et al. | |
| 2018/0041047 A1 | 2/2018 | Partovi et al. | |
| 2018/0131847 A1 | 5/2018 | Kokonaski et al. | |
| 2018/0184189 A1 | 6/2018 | Boesen | |
| 2018/0241250 A1* | 8/2018 | Kahlman | H04B 5/79 |
| 2019/0067979 A1 | 2/2019 | van der Sluys | |
| 2020/0144837 A1 | 5/2020 | To et al. | |
| 2021/0359556 A1 | 11/2021 | Bossetti et al. | |
| 2022/0081923 A1 | 3/2022 | Wankewycz | |
| 2022/0104044 A1 | 3/2022 | Huang et al. | |

OTHER PUBLICATIONS

[No Author Listed] "Mophie Charge Force iPhone Case Review" uploaded on Jul. 2, 2016, Retrieved from the Internet at <https://www.youtube.com/watch?v=-NjE_1IVNIc> on Mar. 22, 2023, 1 page.

[No Author Listed] "Mophie Charge Force Power System for iPhone 6/s/Plus and Galaxy S7/Edge Review," uploaded on Jun. 30, 2016, Retrieved from the Internet at <https://www.youtube.com/watch?v=WkDRuXjliLc> on Mar. 22, 2023, 1 page.

[No Author Listed] "Mophie Juice Pack and Charge Force," uploaded on Aug. 9, 2017, Retrieved from the Internet at <https://www.youtube.com/watch?v=2JvSAOLPYzk> on Mar. 22, 2023, 1 page.

[No Author Listed] "Product Spotlight—mophie Charge Force Series (By Hitfar)" uploaded on Feb. 28, 2017, Retrieved from the Internet at <https://www.youtube.com/watch?v=Y4wsT0qOmVI> on Mar. 22, 2023, 1 page.

[No Author Listed] "Wireless charging for the iPhone 7? Mophie Juice Pack Air Review—iPhone 7 Battery cases," uploaded on Jan. 15, 2017, Retrieved from the Internet at <https://www.youtube.com/watch?v=nncNm59cGg8> on Mar. 22, 2023, 1 page.

[No Author Listed] eBay webpage, Mophie Charge Force QI Wireless Charging Base for Apple iPhone 8/X/XR Retrieved from the Internet at <https://www.ebay.com/itm/223344436531> on Mar. 22, 2023, 1 page.

Singleton, M., "You can wirelessly charge your smartphone anwhere with Mophie's new magnetic battery pack," Jun. 7, 2017, Retrieved from the Internet at <https://www.theverge.com/circuitbreaker/2017/6/7/15753844/mophie-charge-force-powerstation-mini-iphone-samsung-battery> on Mar. 22, 2023, 20 pages.

**Avido, LLC—"WiBa: 100% Wireless & Stackable Power Bank & Fast Charging Pad," AVIDO, https://avidopower.com/product/wiba-2/, Sep. 20, 2018.

**Lucid Chargers—"The Sticker Power Bank," KICKSTARTER, https://www.kickstarter.com/projects/thestickerpowerbank/the-sticker-power-bank?ref=nav_search&result=project&term=the%20sticker, Aug. 15, 2018.

**Will Kail—"Bunk", Instagram, https://www.instagram.com/p/Bh4Z7sQFWW4/?utmsource=ig_share_sheet&igshid=13zgelhtxkkcw, Apr. 22, 2018.

* cited by examiner

WIRELESS MOBILE BATTERY

PRIORITY

This patent application is a continuation of U.S. patent application Ser. No. 16/531,060, which claims priority from provisional U.S. patent application No. 62/714,640, filed Aug. 3, 2018, entitled, "WIRELESS MOBILE BATTERY," and naming William Vahle and Lukas Scheurer as inventors, the disclosures of which are incorporated herein, in their entirety, by reference.

This patent application also claims priority from United States design patent application numbers 29/664,014, filed Sep. 20, 2018, entitled "BATTERY CHARGING DEVICE", and Ser. No. 29/666,864, filed Oct. 16, 2018, entitled, "BATTERY CHARGING DEVICE," and naming William Vahle and Lukas Scheurer as inventors, the disclosures of which are incorporated herein, in their entirety, by reference.

FIELD OF THE INVENTION

Illustrative embodiments of the invention generally relate to a battery for charging electronic devices and, more particularly, the illustrative embodiments relate to wireless mobile charging.

BACKGROUND OF THE INVENTION

Increasingly society has become dependent on electronic devices, such as cell phones and laptops. These devices frequently draw power from a connected battery that is internal to the housing of the device. These batteries require charging, for example, from a grid-connected power source.

SUMMARY OF VARIOUS EMBODIMENTS

In accordance with one embodiment of the invention, a method wirelessly charges an electronic device. The method provides an electronic device having a device antenna configured to receive power wirelessly. The method also provides a charging device having a battery having a front surface and a back surface. The charging device includes a first antenna on the front surface, and the first antenna includes a wireless power transmit antenna or a dual-mode antenna. The first antenna is configured to wirelessly transmit power. The charging device also includes a second antenna on the back surface, and the second antenna includes a wireless power receiver antenna or a dual-mode antenna. The second antenna is configured to wirelessly receive power. The charging device further includes an imperforate housing encapsulating the battery, the first antenna, and the second antenna. The housing has a front contact surface and a rear surface. The first antenna is closer to the contact surface, and the second antenna is closer to the rear surface. The method charges the electronic device by positioning the charging device relative to the electronic device such that the first antenna transmits power to the electronic device antenna.

In some embodiments, the contact surface has an adhesive thereon configured to couple the charging device with the electronic device. Additionally, positioning the charging device relative to the electronic device comprises coupling the charging device to the electronic device. In some embodiments, the positioning substantially aligns the first antenna with the device antenna. Among other ways, the charging device may be coupled to the electronic device using the adhesive on the contact surface.

The method may also uncouple the charging device from the electronic device. The method may simultaneously charge the charging device from a grid-connected wireless charger as the charging device charges the electronic device. Additionally, or alternatively, the method may simultaneously charge a second electronic device having a second device antenna by positioning the charging device relative to the second electronic device such that the second antenna transmits power to the second device antenna. In some embodiments, the housing may be sealed and/or monolithic.

In accordance with yet another embodiment, a charging device for wirelessly charging an electronic device has a wireless power receiver antenna. The charging device includes a battery having a front surface and a back surface. The charging device also has a first antenna comprising a wireless power transmit antenna or a dual-mode antenna. The first antenna is configured to wirelessly transmit power. The charging device also has a second antenna. The second antenna includes a wireless power receiver antenna or a dual-mode antenna. The first antenna is configured to wirelessly receive power. The charging device also includes a housing encapsulating the battery, the first antenna, and the second antenna. The housing has a front contact surface opposed to a rear surface, and the contact surface has an adhesive thereon configured to couple the charging device with the electronic device. The first antenna is closer to the contact surface, and the second antenna is closer to the rear surface.

In some embodiments, the rear surface of the housing is configured to couple with a second electronic device. The housing may also be hermetically sealed and/or monolithic. The housing may have a tapered transition surface between the contact surface and the rear surface. Additionally, in some embodiments, a display may protrude from the housing. Among other things, the display may include LEDs. The housing may also encapsulate a heat pipe coupled with the battery.

Although described as wirelessly receiving power, the second antenna may also be configured to wirelessly transmit power. Additionally, the first antenna may also be configured to wirelessly receive power. Furthermore, some embodiments may have two antennas, in which at least one is dual mode. Some other embodiments may have a single antenna that is dual mode.

In accordance with yet another embodiment, a system includes an electronic device having a device antenna configured to receive power wirelessly. The system also includes a charging device having a battery with a front surface and a back surface. The charging device includes a first antenna and a second antenna. The first antenna includes a wireless power transmit antenna or a dual-mode antenna, and is configured to wirelessly transmit power. The includes a wireless power receiver antenna or a dual-mode antenna, and is configured to wirelessly receive power. The charging device includes a housing encapsulating the battery, the first antenna, and the second antenna. The housing has a front contact surface opposed to a rear surface. The contact surface may have an electronic device coupling portion thereon configured to couple the charging device with the electronic device. The first antenna may be closer to the contact surface, and the second antenna may be closer to the rear surface.

The system may further include a grid-powered wireless charger configured to charge the charging device. The housing of the charging device may be hermetically sealed. Furthermore, the contact surface of the housing may have adhesive thereon.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE
EMBODIMENTS

In illustrative embodiments, a charging device (referred to as "charger") has a battery with two antennae that allow for the simultaneous receiving and transmitting of power wirelessly. One of the antennas may transmit power wirelessly, and the other antenna may receive power wirelessly. Because the battery may receive and transmit power wirelessly, it may be encapsulated within a monolithic and/or sealed (e.g., hermetically) housing without any need for external electromechanical connections. Without the ability to both receive and transmit power wirelessly, the charger could not be monolithic, overmolded, and/or sealed without an electromechanical connection. This is because a sealed housing that can receive power wirelessly would result in a charged battery that is otherwise unusable without the destruction of the housing. Alternatively, a sealed housing that can only transmit power wirelessly would result in a single use charge. Accordingly, illustrative embodiments enable the functional and repeated use of a mobile wireless charger in a sealed and/or monolithic housing.

Illustrative embodiments of the charger provide a number of advantages in many situations, including: applications where contamination and/or environmental hazards may prevent usable and/or reliable electromechanical connections, applications where a spark (e.g., created by an electrical connection) may be undesirable, and/or waterproof applications. Additionally, in some embodiments, the housing of the charger may have an adhesive that allows the charger to physically couple to another device. To that end, the wireless transmit antenna may be positioned to face a surface of the housing having the adhesive. Accordingly, the charger may wirelessly transmit power to another device as they are coupled. Simultaneously, the wireless charger may itself be charged wirelessly from another device (such as a grid-connected charger). Details of illustrative embodiments are discussed below.

Figure 1:
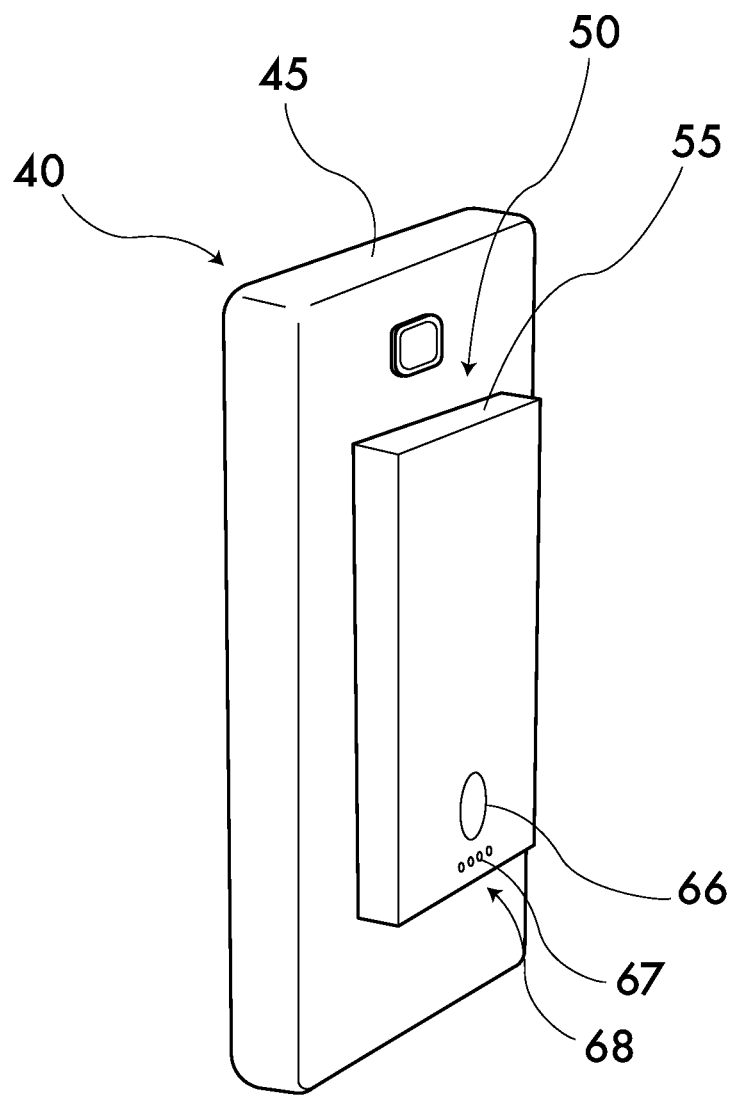
FIG. 1 schematically shows a perspective view of an electronic device coupled with a mobile charger in accordance with illustrative embodiments of the invention.

FIG. 1 schematically shows a perspective view of an electronic device 40 coupled with a mobile charger 50 in accordance with illustrative embodiments of the invention. Most mobile power solutions currently available and currently in use connect to the target powered device 40 using cables/connectors (not shown). However, cables/connectors present a number of disadvantages:

(a) are subject to connector fatigue & fouling (wearing out & getting dirty),
(b) fray and fall apart,
(c) connectors are not designed to exclude water or corrosive substances,
(d) physically snap/break off, often damaging the device 40,
(e) dramatically hamper the form factor, ergonomics and usability of the mobile electronic device 40,
(f) impair the portability of the device 40 receiving power.

Mobile power solutions that provide power to connected devices 40 via one or more cables/connectors may often themselves embody a second device for the user to physically manage, and may be cumbersome, while connecting cables and mechanical accessories (e.g., bulky mechanical connections, electromechanical connectors, overly thick housings, USB-to-device cables) create an unwieldy and undesirable user experience.

Additionally, many mobile power solutions enclose a majority of the receiving device 40 (e.g., a mobile phone charging case) and may hamper the usability of the physical form factor of the device 40. The availability of power in mobile electronics is a constant, critical challenge, and an ongoing focus in the design of mobile electronics. By providing more power to the user's device 40, the user may make more use of the device 40 without running out of battery power.

Illustrative embodiments of the invention provide a wireless charger 50 having a number of advantages. For example, illustrative embodiments provide a robust wireless charger 50 with no need for electromechanical connectors. Instead, the charger 50 uses inductive coils for wireless power transmission and reception. Furthermore, illustrative embodiments offer protection from corrosion and fouling to which mechanical power connections are particularly susceptible.

Further advantages of illustrative embodiments include that no tangible external connection is required for proper operation, allowing for superior protection from liquid infiltration, electrostatic discharge, dust infiltration, corrosion, contact fatigue, corrosive materials, gaseous infiltration, electrostatic discharge, exposure to vacuum or extreme atmospheric pressures, explosive gases etc. Accordingly, the charger 50 may be imperforate, and/or have a monolithic and/or sealed housing 55. Additionally, such a charger 50 may be universally attachable to receiving mobile devices 40 by means of a reusable adhesive film, or other technologies such as magnets or simple mechanical connections.

As described previously, the charger 50 may provide power to mobile electronics devices 40 such as, for example, mobile phones and tablets. The charger 50 may also provide power to tools, measurement equipment, sensors, communication devices, lights, and/or any mobile device 40 which can receive power or be made to receive power through means of wireless power transfer. The charger 50 may also be utilized to provide power to a device 40 which may be considered stationary.

As shown in FIG. 1, electronic device 40 may have a generally rectangular body 45 and the charger 50 may have a housing 55. The housing 55 may be dimensioned so as to form an ergonomic whole when affixed to the electronic device 40, such as by dimensioning the housing 55 in accordance with the dimensions of the electronic device body 45. Various examples of the shape of the housing 55 may be found, for example, in U.S. design patent applications 29/664,014 and 29/666,864, which are incorporated herein by reference in their entireties.

The charger 50 may include components for communicating and/or displaying information to the user regarding the state of the charger 50 (e.g., battery level remaining). For example, the charger 50 may include a display 68, such as LEDs 67, which may be used to communicate information such as state of charge, error conditions, device connectivity etc. Illustrative embodiments may also include a graphic display, touchscreen display, two dimensional LED matrix, three dimensional LED matrix, and/or electromechanical indicator. It should be understood that the LEDs 67 are merely illustrative. The charger 50 may also include one or more user interfaces/buttons 66 that are used to control the state of the charger 50. In some embodiments, the button 66 may be a capacitive touch button.

FIG. 1 illustrates one embodiment of a single pushbutton 66. Manipulation of the button 66 may cause the charger 50 to change states, such as from an OFF state to an ON state and vice-versa. Additionally, manipulation of the button may display or change operating parameters, such as to activate a secondary transmitter, switch the operating mode of an antenna, and/or activate a function of the charger 50. The embodiment illustrated in FIG. 1 is illustrative of one of many possible configurations.

The charger 50 may have a wireless communication interface, e.g., WiFi, Bluetooth, etc., to allow for communication with the charger system such as by a smartphone app, e.g., for configuring or controlling the charger 50. For example, the battery 102 may perform charging differently based on the type of device 40 (e.g., smartphone) to which it is connected, or based on the level of charge of the device 40 to which it is connected, and such information could be learned by the charger 50 via a wireless connection to the device or smartphone app. For example, the charger 40 may include its own "smart" charging operation modes to conserve its own battery power, e.g., switching to a "trickle" charge when the connected device 40 is above a predetermined charge, thereby saving battery life on the charger 50. In some embodiments, the battery level of the connected device 40 can be detected via the antenna and the charging mode may be controlled accordingly. In some embodiments, the wireless communication interface may be accessed/controlled through the display 68 or button 66.

Figure 2:
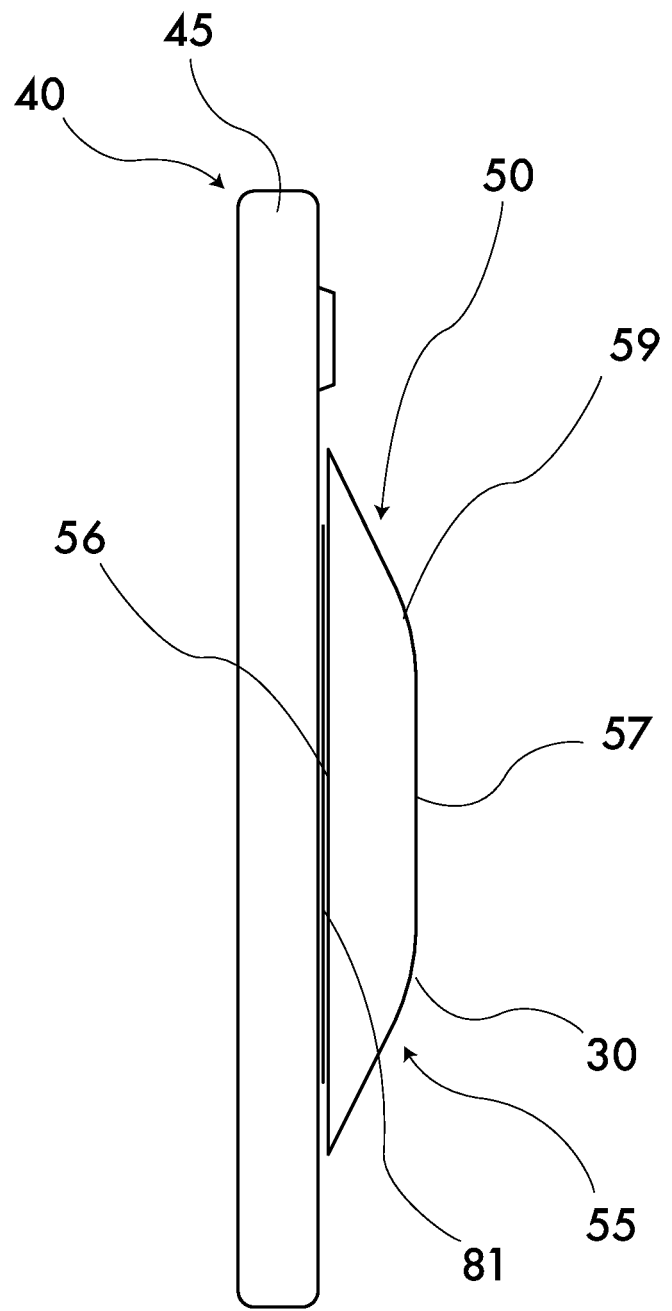
FIG. 2 schematically shows a side view of the electronic device coupled with the mobile charger in accordance with illustrative embodiments of the invention.

FIG. 2 schematically shows a side view of the electronic device 40 coupled with the mobile charger 50 in accordance with illustrative embodiments of the invention. The charger 50 of FIG. 2 has an alternative housing 55, but may otherwise be identical to the charger 50 of FIG. 1. As shown in FIG. 2, the housing 55 may have one or more tapered surfaces 59 from a front surface 56 configured to contact the device 40 (also referred to as contact surface 56) to an opposed rear surface 57. The tapered surface 59 provides the advantage of reducing contact points and/or friction that may otherwise dislodge the charger 50 from device 40 (e.g., when removed from a user's pocket).

Figure 9:
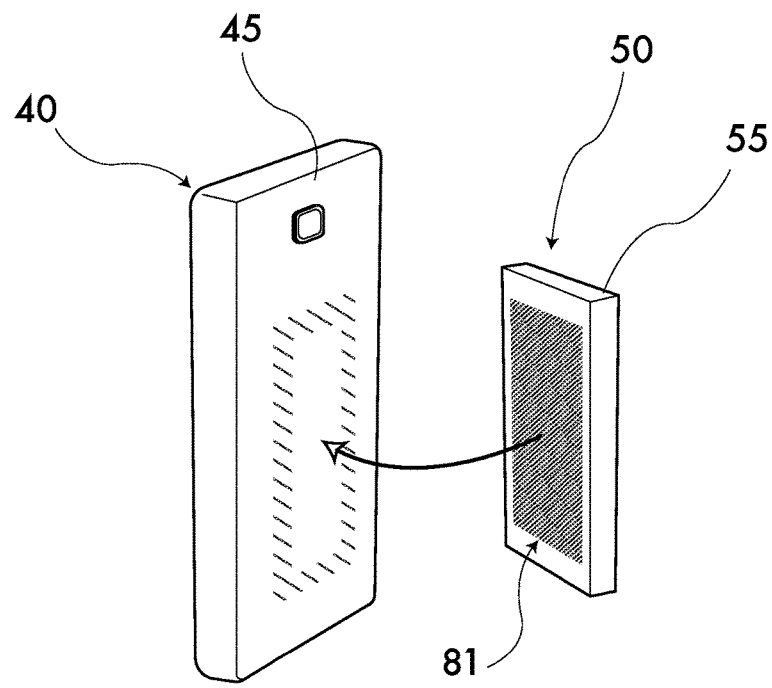
FIG. 9 schematically shows coupling the mobile charger to an electronic device in accordance with illustrative embodiments of the invention.
Figure 9:
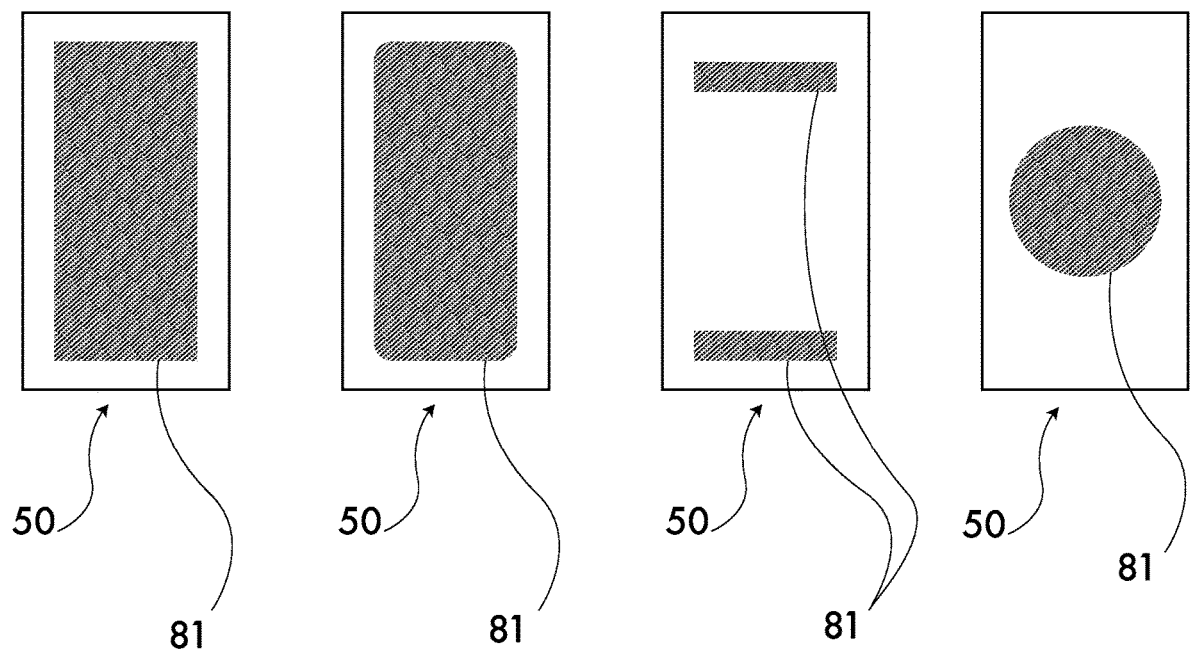

The charger 50 may be coupled to the electronic device 40, for example, by a coupling portion 81 (e.g., reusable adhesive film 81). Additionally, or alternatively, the charger 50 may also be coupled to the electronic device 40 using a coupling portion, for example, magnets, suction cups, hook and loop fasteners, etc. Alternative configurations of means for coupling the charger 50 to a mobile electronic device 40 are illustrated in FIG. 9.

In illustrative embodiments, the housing 55 may be shaped and/or dimensioned differently than shown. The examples shown in the figures are merely illustrative. For example, the housing 55 may be dimensioned to correspond with the device 40, so as to form a whole which is more physically compatible with the device 40. Among other things, the electronic device 40 may be a smartphone, a portable media player, a tablet, and/or a headphone case. Further examples may include portable measurement equipment, portable or fixed sensor devices, communication devices, flashlights or electrically powered tools. The housing 55 may have different dimensioning, may be thinner or thicker, may have a convoluted exterior, and may have a design whose ergonomics and/or dimensioning correspond to an electronic device 40 with which it is primarily intended or marketed to be used. For example, the charger 50 may be dimensioned different for an iPhone as opposed to an iPad. The example of FIG. 1 is merely illustrative.

As an example of dimensions that some embodiments of the charger 50 may have, the housing 55 may have a length of about 103 mm, a width of about 57 mm, and a thickness of about 9 mm at its thickest point. The charger 50 with the above described dimensions may have, for example, a battery 102 with a capacity of about 2,700 mAh to about 3,100 mAh. In some embodiments, the thickness of the housing 55 may be between about 5 mm and about 12 mm. In some embodiments, the width may be between about 30 mm and about 100 mm. In some embodiments, the length may be between about 50 mm and 120 mm.

Figure 4:
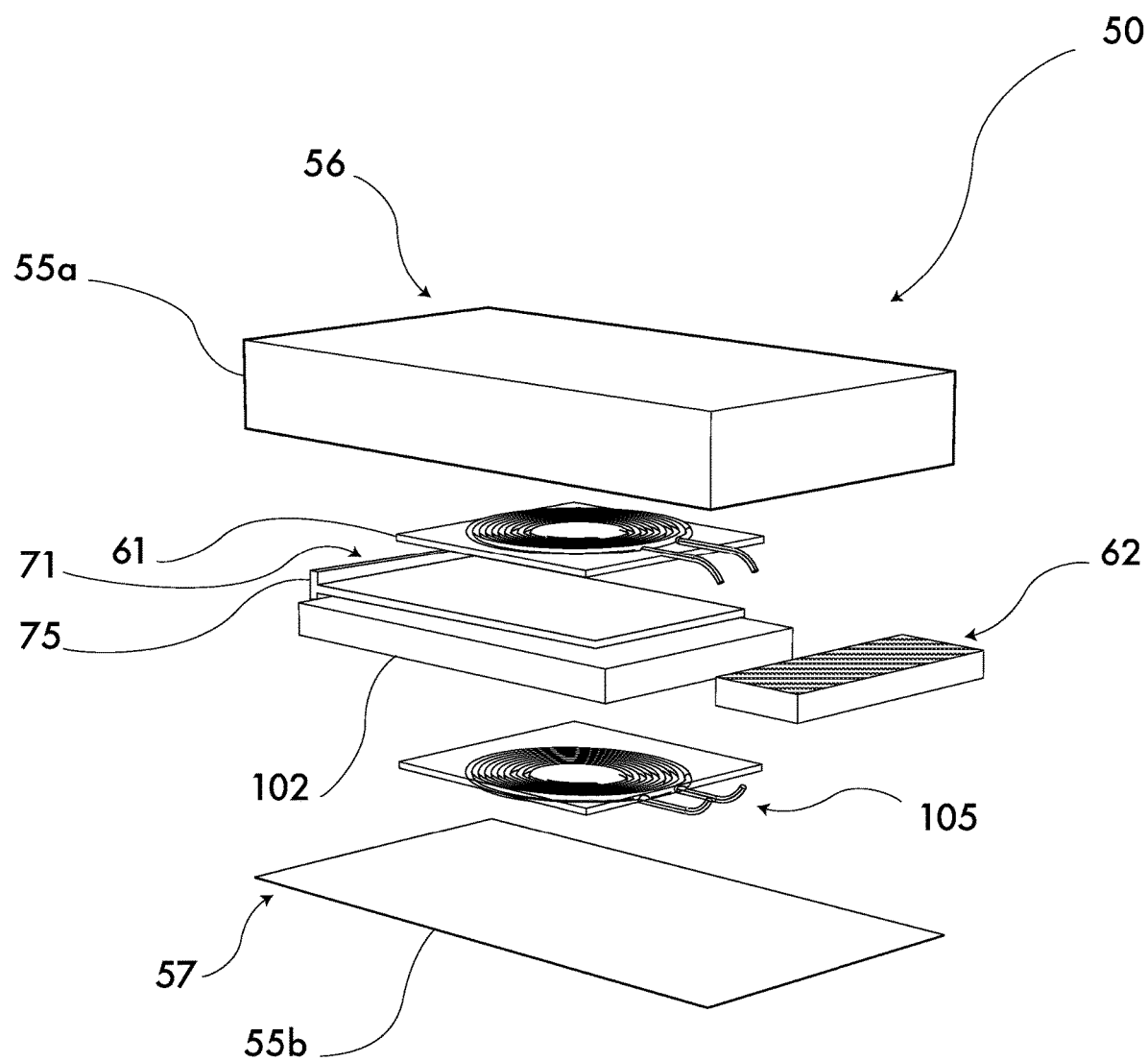
FIG. 4 schematically shows an exploded perspective view of the charger in in accordance with illustrative embodiments of the invention.

The electronic device 40 may contain an antenna or antennae for the reception of power via means of wireless power transfer (e.g., see FIG. 4). In illustrative embodiments, the housing 55 is dimensioned such that when it is coupled to the electronic device 45 (e.g., a front surface 56 contacts the body 45), the receiving antenna in the body 45 is positioned and aligned with respect to the transmitting antenna in body 55 for efficient wireless transfer of power.

Wireless transfer of power may be achieved by one or more antennae. The antenna has a segment or segments of material formed in a manner such that its electrical and mechanical properties are useful in the transmission of power to or from one or more other antennae. Additionally, any antennae in the charger 50 and/or device 40 may be utilized for the transmission or receiving of power at different times, in different embodiments or in different modes of operation.

Additionally, the antenna may consist of multiple sub-segments which may themselves be classifiable as antennae, but which together act in concert to form a single functional block, such as in a phased array system. Additionally, such antennae acting in concert may also act in multiple modes concurrently or discretely, for the potential use of the array to function in both receive and transmit states, such as through a time division multiplexed system. In some embodiments, antenna components and designs used in the charger 50 may be off-the-shelf and commercially available, particularly as concerns compliance with any published standard for wireless power transfer. Furthermore, antennae used in the wireless transfer of power may also communicate information pertinent to the transfer of power.

In some embodiments, one or more antennae may be constructed from wound copper wire (e.g., multi-stranded, Litz, dimensionally braided, solid), printed circuit boards, flexible printed circuit boards, stamped metal, and/or any configuration of conductor, semi-conductor, dielectric, insulator, ferrite etc. that is utilized within the charger 50 as an antenna for the purposes of wireless power transfer. The antenna need not necessarily be composed of only a single element, but may also consist of multiple active or passive elements which work independently or in unison to achieve the wireless transfer of power. Additionally, consideration of a single antenna or cooperative antennae may also include various operating states wherein discrete elements function in concert or independently in configurations determined to be most effective for the wireless transfer of power.

Figure 3:
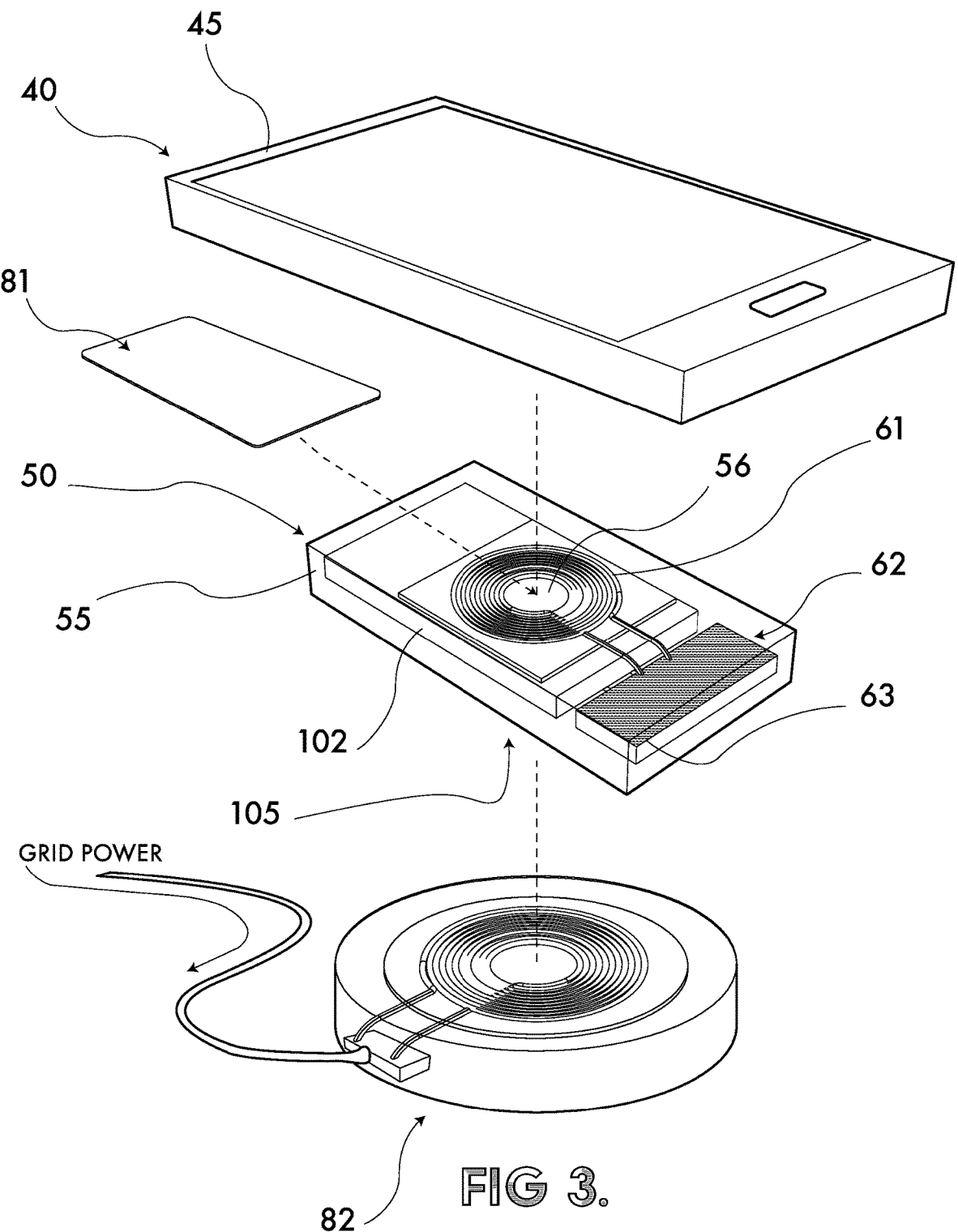
FIG. 3 schematically shows a perspective view of an arrangement of a grid powered wireless charger, the electronic device, and the mobile charger for storing and receiving power in accordance with illustrative embodiments of the invention.

FIG. 3 schematically shows a perspective view of an arrangement of a grid powered wireless charger 82, the electronic device 40, and the mobile charger 50 for storing and receiving power in accordance with illustrative embodiments of the invention. The housing 55 may contain (e.g., encapsulate) a battery 102, such as a prismatic battery cell. The battery is an energy storage medium including, e.g., lithium based batteries, nickel based batteries, carbon based batteries, aluminum batteries, supercapacitor-type cells, or any medium for the storage and release of electrical power.

The charger 50 may include a means of affixing the housing 55 to the mobile electronic device 40. The charger 50 may include any suitable number of antennae (e.g., one or more, two or more, three or more, four or more, etc.), which may be utilized for any number of purposes, including the transmission and/or reception of power. The antennae within device 40 may be of many various types, (e.g., distributed or multi-part antennae, consisting of either whole or parts of structural elements; flexible circuit board antennae; coiled wire or film antennae, etc.).

In illustrative embodiments, the charger 50 contains two antennae—antenna 61 and antenna 105 (underside, not visible in FIG. 3). The charger 50 is depicted in a partly exploded view, in a configuration in which the charger 50 is receiving power wirelessly from a grid-powered Qi wireless charger 82, e.g., via bottom antenna 105. The grid-powered charger 82 represents an external "fixed source". The fixed source charger 82 may be a source of power external to the charger 50 (e.g., provided by the user) that is intended to wirelessly provide power to the charger 50, or directly to the end device 40. Such a source would typically be driven by grid power, and is described here as a "fixed-source".

In some embodiments, the antenna 61 is a wireless transmit antenna and the antenna 105 is a wireless receive antenna. Furthermore, either, or both, of the antennas 61 and 105 may be wireless dual-mode antennas capable of alternating between receiving power wirelessly and transmitting power wirelessly. Additionally, or alternatively, the charger 50 may include antennas that are dual-mode antennas. Furthermore, the charger may include more than two antennas 61, 105, for example, two antennas on each side of the battery 102.

Depending on the rate at which the mobile electronic device 40 receives power, the present state of charge of the device 40, the current state of charge of the charger 55, and other ancillary factors like device 40 temperature etc., a number of different states are possible. Enumerated below are possible states, which are provided for illustrative purposes and are not intended to be exhaustive list of possible device states, but rather is intended to facilitate discussion of illustrative embodiments:

a) In illustrative embodiments where a mobile electronic device 40 accepts power at a rate that is less than the available power as supplied by an external "fixed-source" charger 82, the charger 50 may receive and store this excess power in its internal battery 102. While supplying power to the mobile electronic device 40 at the full rate it will accept, the charger's 50 internal battery 102 may increase its state of charge simultaneously. Thus, the rate at which power is stored in the combined mobile form factor may be increased.

b) In illustrative embodiments where a mobile electronic device 40 is accepting power at a rate equivalent to or greater than the rate at which power is available from an external "fixed-source" 82, the charger 50 may pass power received from the external source through itself and to the mobile electronic device 40 via means of wireless power transmission, while not simultaneously charging the internal battery 102. This may, for example, be because the charger's 50 internal battery 102 is nominally at a 0% state of charge and no battery power is available to supplement the power received from the external source, or because the state of charge of the charger's 50 internal battery 102 is nominally at 100% and current drawn by the mobile electronic device 40 is too small to warrant drawing down the charger's internal battery 102 (e.g., device 40 is connected to the charger 50, but is drawing only a standby-level of power).

c) In illustrative embodiments where the mobile electronic device 40 is accepting power at a rate which is greater than the rate at which power is available from an external "fixed-source" 82, the charger 50 may pass the external power input through itself from its internal receiving circuitry to transmission circuitry, and supplementally supply power to the transmission circuitry up to the maximum rate which the charger's 50 internal battery allows, or up to the rate at which the end-device 40 will receive.

d) In illustrative embodiments where the charger 50 is coupled to the mobile electronic device 40 and no external "fixed-source" 82 is present, charger 50 may supply power from its internal battery 102 to the mobile electronic device 40.

FIG. 4 schematically shows an exploded perspective view of the charger 50 in accordance with illustrative embodiments of the invention. As described previously, the charger 50 may contain internal electronics. For example, the charger 50 may include circuitry that facilitates the wireless transfer of power via illustrative antenna 61 and a second antenna 105 underneath. The internal electronics may contain elements such as circuits configured to condition and make useful power received wireless ("receiving circuitry"); they may contain circuits designed to supply electrical power to an antenna for the purposes of transmission to another device 40 ("transmitting circuitry"); they may contain circuits useful for charging a battery 102 internal to the charger 50; they may contain electronics which make useful power which is drawn from an internal storage source such as a battery 102. Additionally, internal electronics may also contain circuits to perform various functions, such as to control a display (e.g., to provide operational and charging status and/or statistics), to cause the charger 50 to change states (e.g., to switch from an OFF state to an ON state and vice-versa), to sense internal and external parameters and circumstances (e.g., the presence of a receiver and/or transmitter, human handling of charger 50, charger 50 temperature etc.), to activate functions based on various charger 50 state stimuli, to change/display operating parameters, to activate a secondary transmitter, and/or to switch the operating mode of an antenna, such as to activate other charger 50 function(s). In some embodiments, the mode of the dual-mode antenna may be controlled.

The housing 55 may be formed by overmolding, whereby the components internal to the charger 50 are placed in an apparatus which flows a polymer plastic or other material around the components in one or more operations in order to encapsulate the internal components of the charger 50. Overmolding here is intended to include processes similar to overmolding such as potting, whereby the charger 50 is placed in a shell housing and material is deposited into the shell around the components thus encapsulating the charger 50. Accordingly, in some embodiments, the charger 50 and internal components are monolithic (e.g., a single piece with no superfluous internal cavities and/or no access to internal regions of the charger 50). The overmolding process may also be conducted in a manner so as to form and/or make allowance for a component that directs light from an internal light source to the exterior of the charger 50 for purposes of the display of information (e.g., see display 68 in FIG. 1); allowances for and/or the presence of such a component may not necessarily obviate description of the charger 50 as imperforate and/or monolithic.

Other assembly methods include casting, traditional encapsulation, assembly in a housing with additional encapsulant, injection molding, and simple assembly within the housing 55 (e.g., the housing 55 may be constructed of plastic, metal, composite materials, glass etc., and may be fastened with threaded fasteners, glue/epoxy, ultrasonic welding, and/or other means known to those skilled in the art).

Although the housing 55 is shown as two parts 55a and 55b, it should be understood that this is merely illustrative and not intended to limit various embodiments of the invention. For example, using the overmolding process described, these two pieces 55a and 55b would form a single piece. However, some other embodiments may form the housing 55 from two or more pieces 55a and 55b as shown.

The overmolding or other manufacturing process of the housing 55 is may also account for other components that are exposed in illustrative embodiments. The components may include component(s) that are intended for use as user input such as the pushbutton 66 represented in FIG. 1. Such an input may also include constructions whereby the user may change the state of the charger 50 by means other than actuation of an electromechanical component, such as capacitive sensing circuits, resistive touch sensing circuits or other components that allow the user to affect input to the control electronics. These circuits may be contained within the housing 55 of the charger 50. They may also be constructed by being affixed on the exterior of the charger 50. Illustrative embodiments of the charger 50 include an electromechanical pushbutton contained within the housing 55, around which a housing is constructed using overmolding or potting techniques.

The housing 55 may be constructed by molding polymer around internal components (e.g., antennae, circuit boards, batteries, light pipes etc.) thus producing complete encapsulation of the internal components of the charger 50. Such a manufacturing process may be accomplished in multiple steps and with many different materials. The housing 55 manufactured by such methods may have an advantage over other processes in the form of a decreased minimum suitable wall thickness, and thus a reduced overall size. Such a manufacturing process may also incorporate materials within the encapsulant material that are intended to improve the thermal management characteristics of the charger 50 (inf. thermal management materials) through their heat absorption, retention, release, distribution and dissipation characteristics. Manufacturing utilizing this technique may yield a charger 50 whose usefulness is increased by virtue of one or more of the following benefits: decreased size, decreased cost, increased manufacturing yield, more suitable heat dissipation, increased resistance to external environmental elements (e.g., corrosion, contaminant infiltration, electrostatic discharge damage etc.), improved cross-contamination resistance (e.g., more easily sterilized), increased tolerance of deformation, torsional force, crushing, and/or resistance to puncture or prying.

As described herein, illustrative embodiments provide the advantage that the housing 55 may be imperforate (i.e., the housing 55 does not have any input ports for electromechanical connectors). The imperforate housing 55 lacks the normal opening for an electromechanical connection generally seen for electronic devices 40. In some embodiments, the charger 50 may not be imperforate, and thus, may have an opening for an interface in the housing 55 (e.g., USB-type, Apple Lightning). However, in some embodiments, the housing 55 is imperforate and does not have the opening for interfaces (e.g., USB-type, Apple Lightning). Thus, the charger 50 may not use an electromechanical connection to charge other devices 40 or to be charged. Accordingly, in some embodiments, another advantage is that the charger 50 may charge a device 40 without using one of its electromechanical connections (e.g., charging a smartphone using an electromechanical connection in some instances prevents the user from plugging in audio headphones into the smartphone).

In the context of this description and accompanying claims, an imperforate housing 55 lacks any of the physical interfaces generally found on electronic devices 40 for receiving or transmitting electrical power, e.g., a power receptacle, a USB port, etc., and generally also lacks any other physical openings that could allow moisture or debris into the charger 50, e.g., openings for ventilation or audio, other communication ports, etc.

Additionally, the charger 50 may also exhibit increased resistance to harsh environments as a result of robust sealing (e.g., as accomplished via molding). Such improvements may be further utilized by the elimination of any external orifice on the charger 50, thus preventing the infiltration of environmental hazards harmful to its operation or which may damage the useful lifespan of the charger 50. Environmental hazards include corrosion, contact fouling/fatigue, water infiltration, dust infiltration, corrosive materials, gases or liquids infiltration, electrostatic discharge, exposure to vacuum or extreme atmospheric pressures, etc. Additionally, utilization of manufacturing techniques described herein may allow the manufacturer of the charger 50 to reconfigure the form factor of the housing, such as to allow for the inclusion of a larger battery 102 and/or to optimize ergonomic coupling with mobile electronic device 40, at a low cost, as limited changes may be made to the external form factor of the charger 50 without mandating additional changes to any enclosed electronics.

The charger 50 may also contain ferritic/ferromagnetic material that provide magnetic fixturing of the charger 50 to devices 40 with which the user intends to conduct a wireless transfer of power. Additionally, such ferromagnetic material may provide for magnetic fixturing of the charger 50 to an external fixturing mechanism for receiving or transmitting power (e.g., a car dashboard charger). The encapsulant material may also be chosen or modified to achieve desirable dielectric properties to enhance the process of wireless transfer of power, fire resistance, weight, durability, ease of manufacture, thermal characteristics, etc. Molding as referenced here may refer to a number of techniques such as molding, potting, overmolding, casting, encapsulation, and assembly of pre-molded parts with additional encapsulant. The charger 50 may include a heat pipe 71, which may be constructed of a thermally conductive material such as aluminum or copper. The heat pipe 71 manages heat through absorption, retention, release, distribution and dissipation. The heat pipe 71 may include a material included to transfer heat away from the point where heat is generated. The heat pipe 71 may be textured and dimensioned to increase its surface area, to facilitate heat transfer. The enclosure of the charger 50 may be connected to the heat pipe 71, for the purposes of dissipating to the surrounding environment heat generated during charger 50 operation.

The heat pipe 71 may also serve an electromagnetic shielding purpose, such as by the ferrite plate common in wireless power transfer antennae. The illustrative heat pipe 71 is dimensioned and placed within the housing 55 such that it draws heat from the antennae(s) 61,105, circuit board(s) 62, and battery 102, and distributes it more evenly within the housing 55. Accordingly, the heat pipe 71 may eliminate thermal gradients and allow the charger 50 to operate more efficiently. Such a heat pipe 71 may have a surface treatment, such as bead blasting, and dimensioned features, such as cooling fins, which increase the surface area of the component in order to facilitate a greater transfer of heat. The heat pipe 71 may be featured 75 so as to be bonded to the housing 55 to facilitate the transfer of heat for more ready dissipation to the outside environment.

Additionally, or alternatively, the housing 55 may include material which serves to absorb, retain, release, transfer and dissipate heat. Such material may be placed so as to manage the flow of heat within the charger 50, particularly during operation of the charger 50 and most particularly during intensive phases of operation, such that heat is drawn away from sensitive components, such as integrated circuits and battery components, and retained, distributed, released and/or dissipated. Such materials may include materials called phase change materials or other existing or novel materials which achieve the above described characteristics. Such attention to thermal management may prolong the useful lifespan of the charger 50. Such thermal management may also allow for the transfer of greater amounts of power without damaging the charger 50 or its components, thus improving performance and user comfort.

Figure 5:
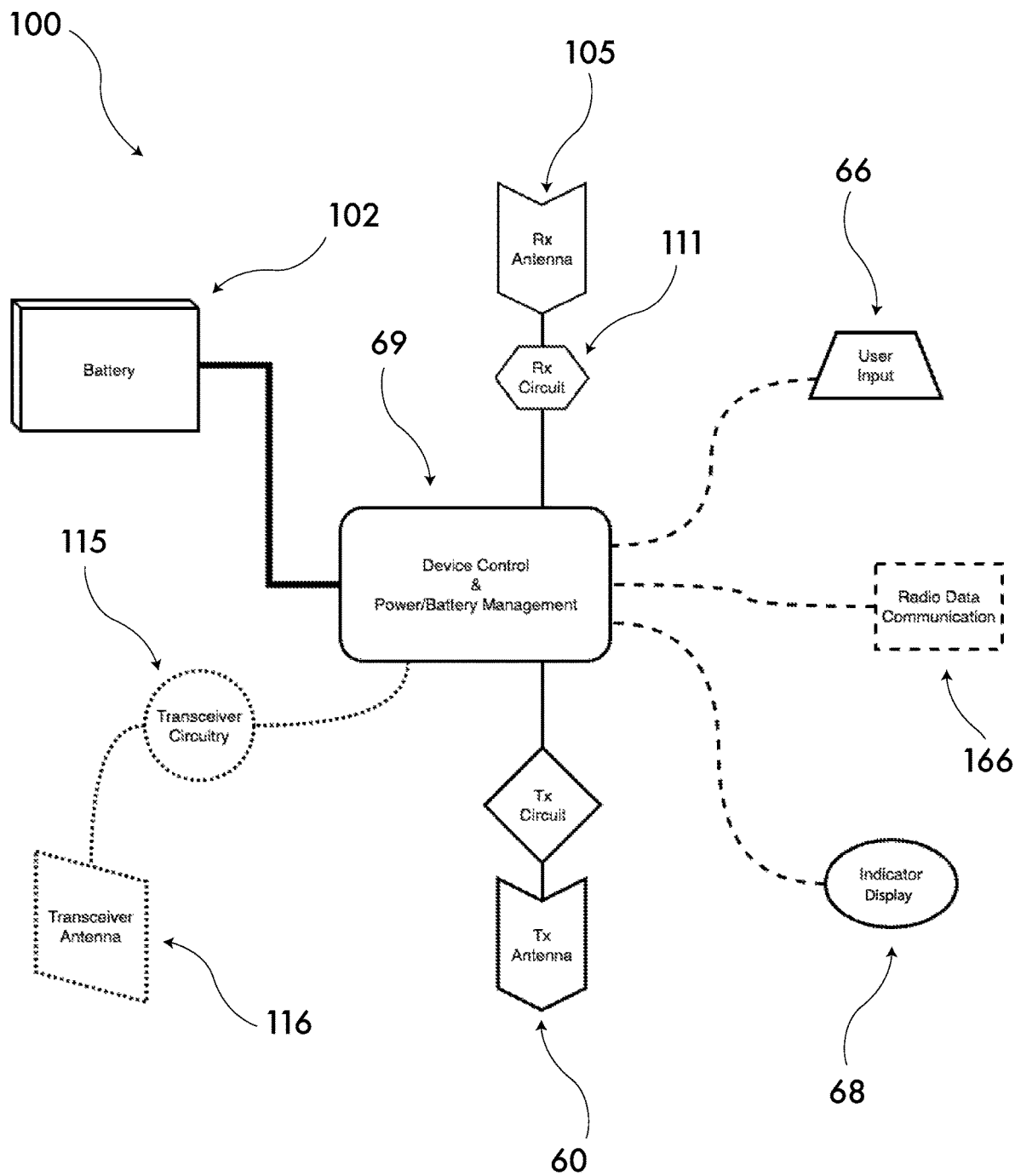
FIG. 5 is a block diagram of a system in accordance with an embodiment.

FIG. 5 is a block diagram of a system 100 in accordance with illustrative embodiments of the invention. As described previously, the battery 102 within the charger 50 may provide electrical power for transmission to an external device 40 through means of wireless power transfer. The power supplied to an external device 40 by means of wireless power transfer may supplement internal battery power in the external device 40. Power may be received by the charger 50, through one or more antenna 105 located on or within the housing 55, and may be passed through the charger 50 and by wireless power transmission (e.g., via transmission circuit and antenna 61) provide power to the external device 40. Power received from an external source may be stored in the enclosed battery 102.

Each of the above-described components may be operatively connected by any conventional interconnect mechanism. FIG. 5 simply shows a bus communicating some of the components. Those skilled in the art should understand that this generalized representation can be modified to include other conventional direct or indirect connections. Accordingly, discussion of a bus is not intended to limit various embodiments.

Indeed, it should be noted that FIG. 5 only schematically shows each of these components. Those skilled in the art should understand that each of these components can be implemented in a variety of conventional manners, such as by using hardware, software, or a combination of hardware and software, across one or more other functional components. For example, the electronics in the charger 50 may be implemented using one or more microprocessors executing firmware. As another example, the receiver circuitry and/or transmitted circuitry may be implemented using one or more application specific integrated circuits (i.e., "ASICs") and related software (e.g., control software), or a combination of ASICs, discrete electronic components (e.g., transistors, logic gates), and/or microprocessors. Accordingly, the representation of the components in a single box of FIG. 5 is for simplicity purposes only. In fact, in some embodiments, the circuitry of FIG. 5 may be distributed across a plurality of circuit boards—not necessarily within the same housing or chassis. Furthermore, some circuitry may be duplicated across circuit boards in order to minimize the number of wiring interconnects necessary. Additionally, in some embodiments, components shown as separate (such as Charger Device Control 69 and the Radio Data Communication 166 in FIG. 5) may be replaced by a single component. Furthermore, certain components and sub-components in FIG. 5 are optional. For example, some embodiments may not use the Radio Data Communication 166.

It should be reiterated that the representation of FIG. 5 is a significantly simplified representation of the charger electronics. Those skilled in the art should understand that the charger 50 may have other physical and functional components, such as power management and conditioning modules, DC-DC converters, bypass capacitors, ESD protection components, and reverse polarity protection diodes. Accordingly, this discussion is not intended to suggest that FIG. 5 represents all of the elements of the charger 50 electronics.

Figure 6:
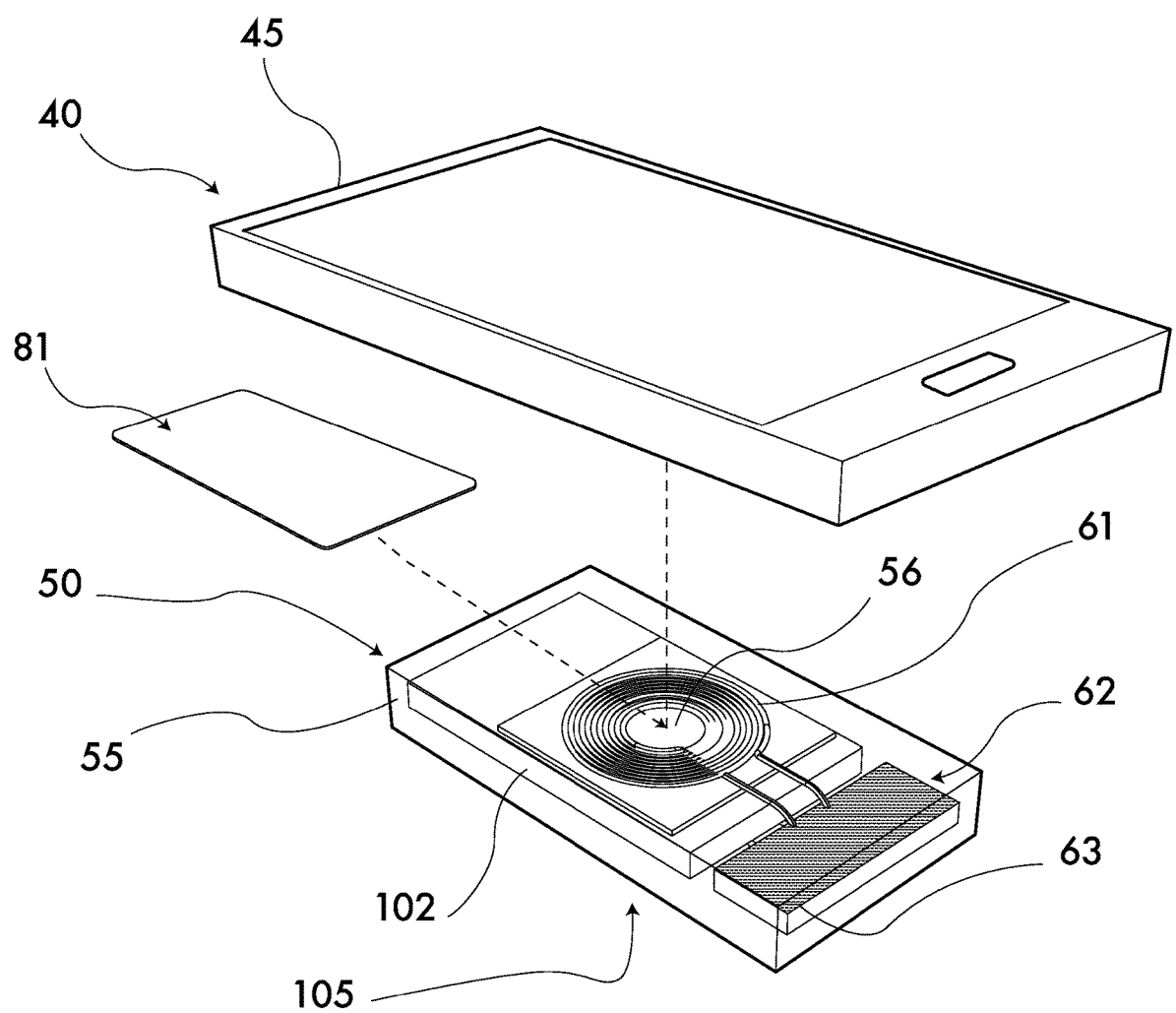
FIG. 6 schematically shows a perspective view of the electronic device and the mobile charger in accordance with illustrative embodiments of the invention.

FIG. 6 schematically shows a perspective view of the electronic device 40 and the mobile charger 50 in accordance with illustrative embodiments of the invention. The charger 50 charges the mobile electronic device 40 (e.g., while coupled to the electronic device 40). Notably, as opposed to FIG. 3, the charger 50 is no longer receiving power from a grid connected fixed wireless-power source 82. Still, the charger 50 provides power to the device 40 from what is stored in the battery 102.

In illustrative embodiments, the antenna 61 is positioned on an opposite side of the battery 102 from the antenna 105. Preferably, the antenna 61 is configured to wirelessly transmit power, while the antenna 105 is configured to wirelessly receive power. Furthermore, in illustrative embodiments, the antenna 61 is configured to transmit power is positioned closest to the front surface 56 (also referred to as the "contact surface 56") of the housing 55. As described previously, the housing 55 may include means for coupling the charger 50 to the device 40 (such as adhesive film 81) on the contact surface. Thus, the charger 50 is configured to charge the device 40 when the two are coupled and/or in close proximity (e.g., if the device 40 is placed on top of contact surface 56 of charger 50 without the use of adhesive or other coupling). Although not shown in this figure, this configuration further provides for the simultaneous receipt of power via the antenna 105 configured to wireless receive power, as the device 40 is charged by the charger 50. The inventors discovered that this arrangement provides advantages such as allowing for simultaneous charging and/or flow through of power from a grid connected fixed source 82 (or other power source), to the charger 50, and ultimately to the device 40. Additionally, many users leave their device 40 and/or charger 50 charging overnight on a grid connected wireless charging source. Accordingly, both the charger 50 and the device 40 may become fully charged without the need for additional action by the user.

Furthermore, the inventors discovered that the wireless receive/wireless transmit antennae configuration of illustrative embodiments provides certain advantages, including that the housing 55 may be monolithic and/or sealed. This provides the advantage that the charger 50 may be washable (e.g., using water). Additionally, the charger 50 may be used in applications where environmental hazards may render electromechanical connections undesirable.

While some embodiments are described as having a monolithic and/or sealed housing 55, in some embodiments the charger 50 may also make use of a wired, electromechanical connection (e.g., microUSB, USB-C) for the purposes of receiving power from or providing power to externally connected devices 40, 40b.

Furthermore, while some embodiments are described as having a plurality of antennas 60, 105, it should be understood that some other embodiments may have a single antenna 60, such as a single dual-mode antenna 60 or a single transmit antenna 60. Accordingly, the dual mode antenna 60 may be used to receive power in a receive mode, and may then transmit power in a transmit mode. In embodiments that have a single transmit antenna 60, they may include an electromechanical connection for receiving power and charging the internal battery 102. Illustrative embodiments having an electromechanical connection for charging the battery may not be considered imperforate.

Figure 7:
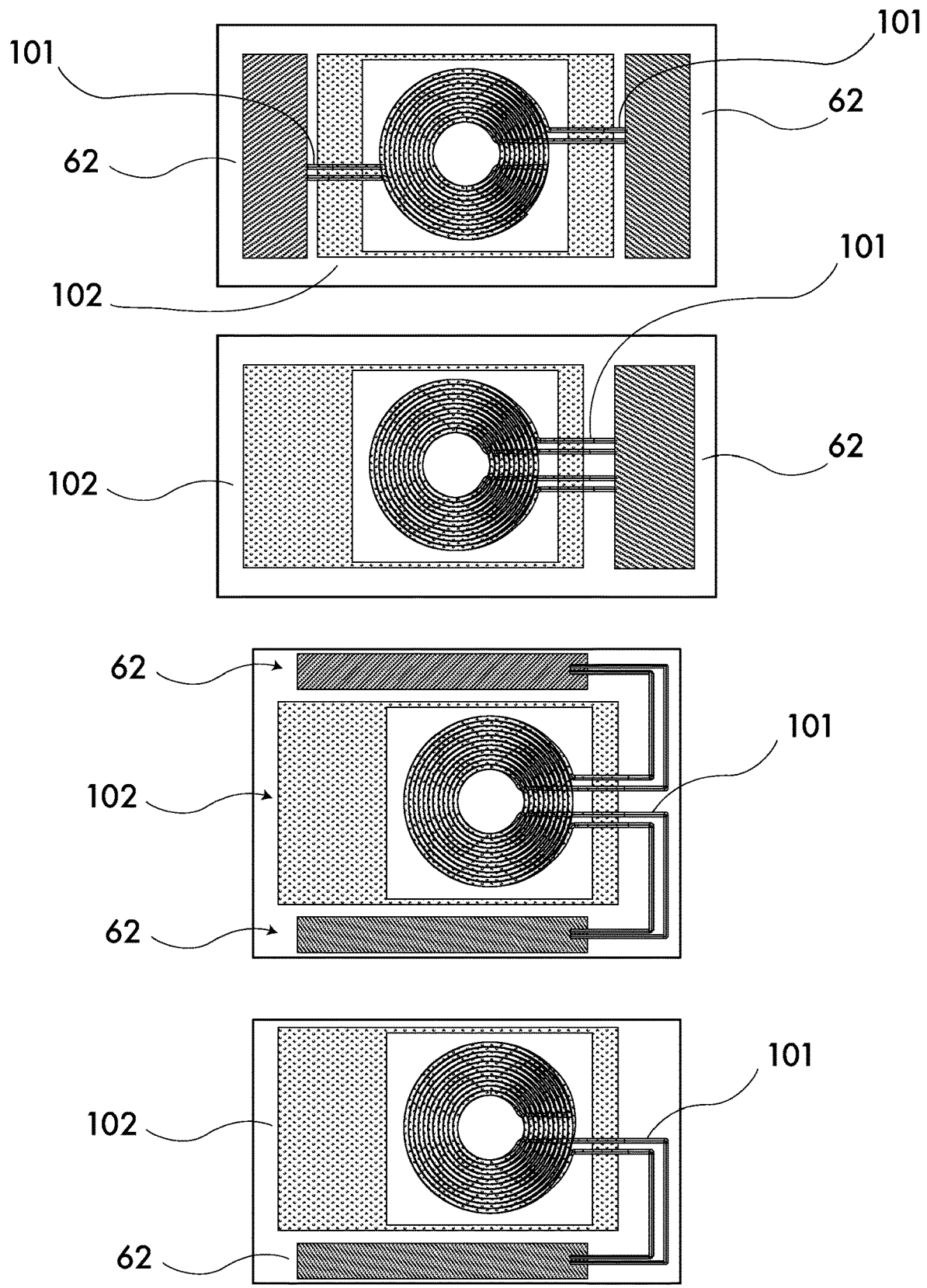
FIG. 7 schematically shows alternative configurations for placement of internal components of the mobile charger in accordance with illustrative embodiments of the invention.

FIG. 7 schematically shows alternative configurations for placement of internal components of the mobile charger 50 in accordance with illustrative embodiments of the invention. Alternative positions of circuit boards 62 within the housing 55.

Figure 8:
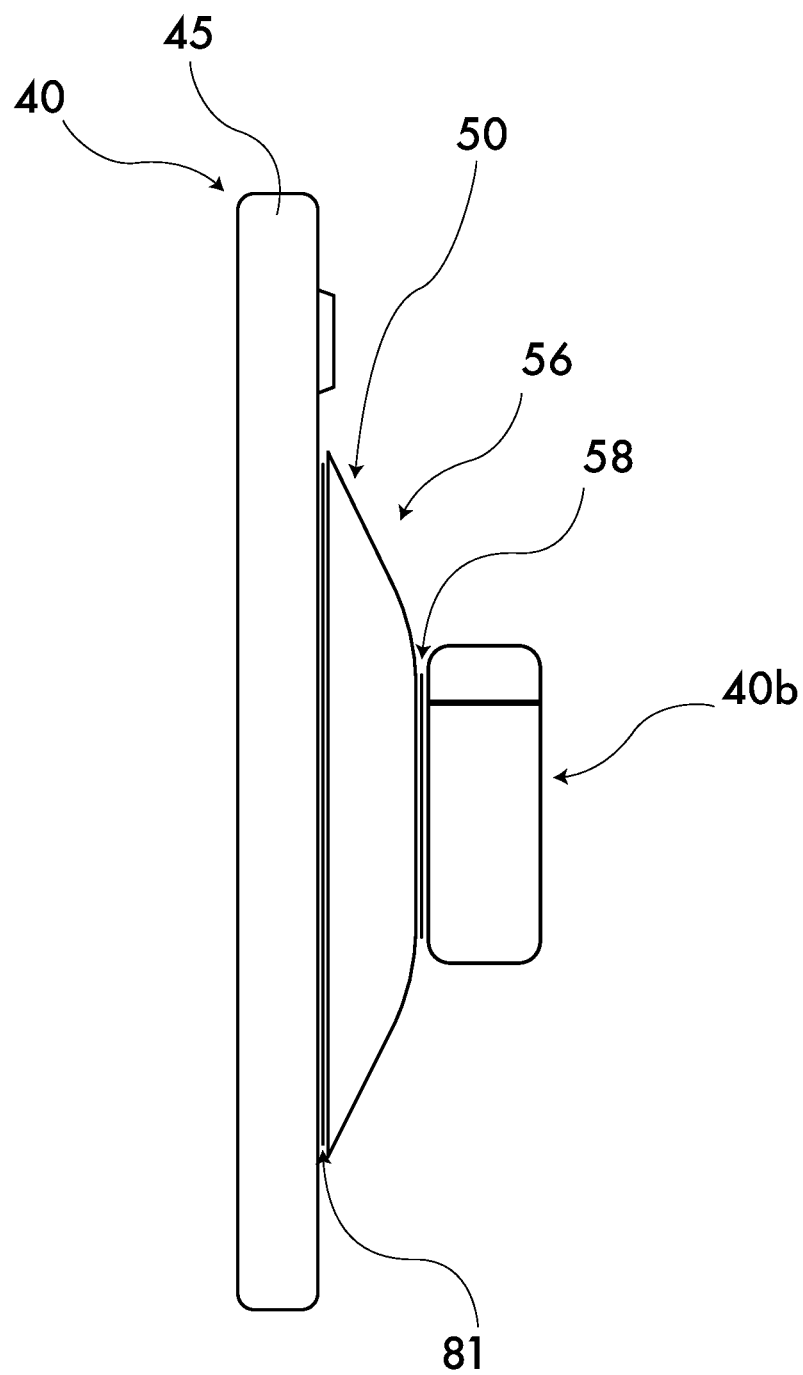
FIG. 8 schematically shows a side view of an electronic device, a mobile charger, and a second electronic device in accordance with illustrative embodiments of the invention.

FIG. 8 schematically shows a side view of the electronic device 40, the mobile charger 50, and a second electronic device 40b in accordance with illustrative embodiments of the invention. Specifically, FIG. 8 illustrates the charger 50 in a mode of operation whereby two mobile electronic devices 40 and 40b are charged simultaneously. Charger 50 is coupled to the additional portable electronic device 40b (e.g., via reusable adhesive film 58). In this case, both antenna 61, 105 would be placed in Tx mode to transfer power from the battery to both devices 40, 40b. Means of coupling the charger 50 to a second portable electronic device 48, third portable electronic device, fourth portable electronic device etc. are not intended to be limited to reusable adhesive film, and are intended to include other means such as those enumerated elsewhere in this disclosure such as magnetics, mechanical means, hook and loop fasteners etc.

FIG. 9 schematically shows alternative embodiments of adhesive for coupling the charger 50 to the electronic device 40 in accordance with illustrative embodiments of the invention. The housing 55 features a means of affixing the charger 50 to a portable electronic device 40 for the wireless transfer of power. Coupling the charger 50 to a mobile electronic device 40 by removable, refixturable, reusable means increases the utility of the charger 50. This provides the advantage of allowing the charger 50 to couple with receiving devices 40, 40b without the complication of device-specific cases or mount points. The charger 50 may have a form factor which is not specifically complementary to any one model of electronic device 40, and an embodiment of such a form factor as is illustrated in FIG. 8. The charger 50 may be useful across many varying models of devices 40, and may be readily reaffixed by the user at will to any number of other compatible electronic devices which may receive power by wireless means. This would allow the user to, for example, affix the charger 50 to a mobile electronic device 40 belonging to a friend, acquaintance, customer, student etc. as the need arises. Examples of how the user experiences increased utility include the ability to remove the charger 50 when the user desires a smaller form factor for the portable electronic device 40, when the user desires to exchange the device 50 for a separate unit which has a different state of charge, when the user desires to remove the charger 50 for charging while not affixed to the portable electronic device 40, or any number of scenarios in which the user desires to reconfigure the combination of device(s) 40, 40b, charger(s) 50, mounting devices etc. Additionally, the charger 50 may be used with any device 40 that includes compatible means of wireless power transfer. This allows the charger 50 to charge various different devices 40 intended to receive power that may not otherwise share compatible charging standards (e.g., Apple iPhone Lightning v.s. Samsung microUSB), obviating the need to carry additional equipment necessary to charge a range of devices 40.

The charger 50 may be affixed to the device 40 which the user intends to receive power from or provide power to by means of a reusable adhesive film. Such an adhesive film may be dimensioned according to the device 40 or devices intended to receive power. The film 81 may be affixed to the charger 50 via permanent adhesive film, or it may also be affixed by other common means of permanent fixturing. The film 81 may be adhered to the charger 50 via a reusable adhesive film. The reusable adhesive film 81 may allow the user to affix the charger 50 to a device 40 or devices transmitting or receiving power at will and repeatably. The reusable adhesive film may allow the user of the charger 50 to remove the charger 50 from the device 40 or devices receiving power at will. The reusable adhesive film may be constructed from a polymer material, for example polyurethane, vinyl or silicone. The reusable adhesive film may utilize "micro suction technology". The reusable adhesive film also may use reusable adhesive film known as "gecko tape". The reusable adhesive film may be maintained by rinsing the film in water or solvent. The reusable adhesive film may be maintained by rinsing the film in water or solvent, with or without the aid of detergent. Additionally, or alternatively, the charger 50 may be affixed to an end-device or devices by more common means such as magnets, hook and loop, mechanical interlock, spring connection, press-fit, various configurations of one or more suction cups, snap-fit, elastic, a mechanical connection etc.

Figure 10:
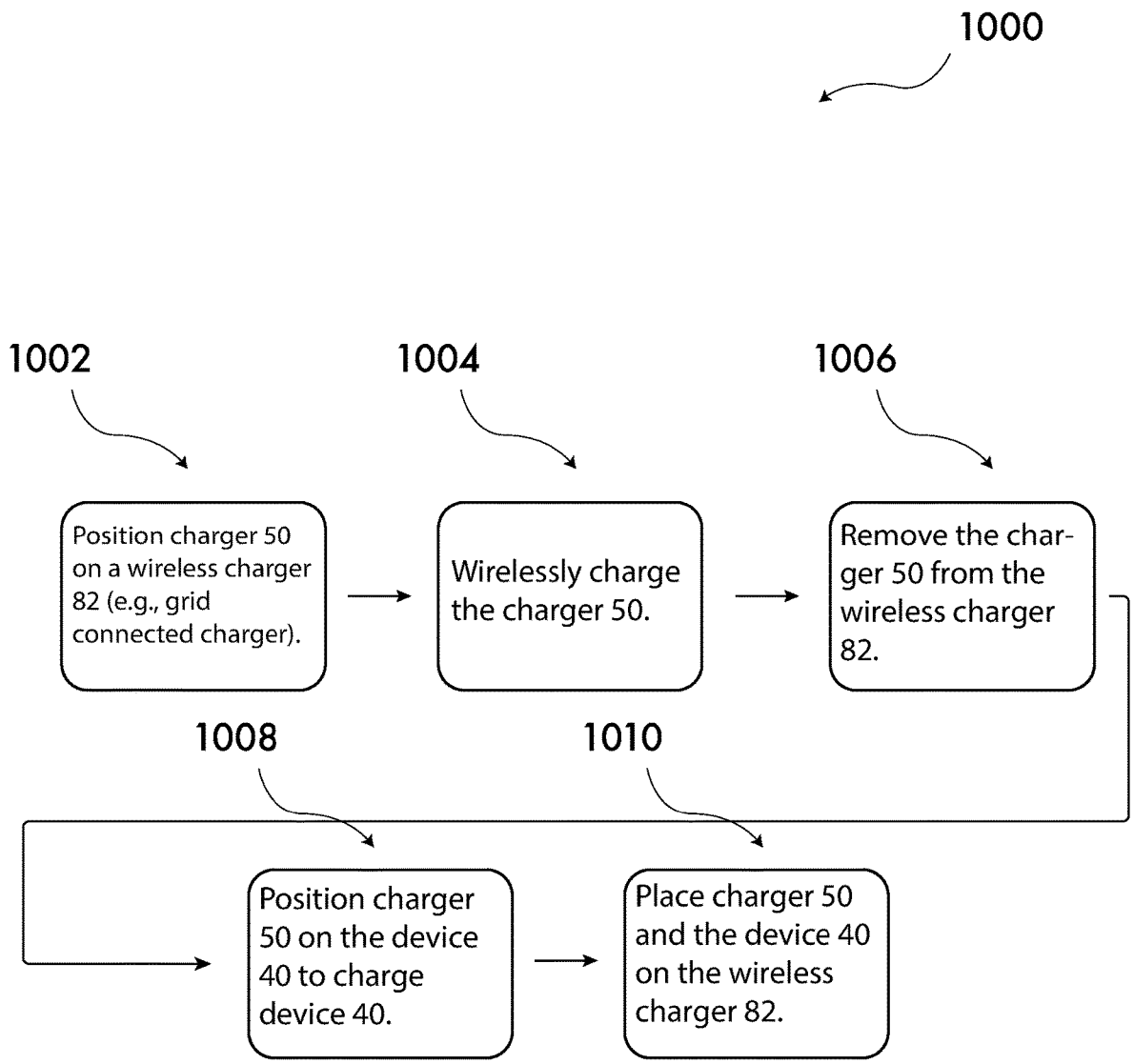
FIG. 10 shows a process of charging the electronic device using the charger in accordance with illustrative embodiments of the invention.

FIG. 10 shows a process 1000 of charging the electronic device 40 using the charger 50 in accordance with illustrative embodiments of the invention. It is should be noted that this process can be a simplified version of a more complex process of charging the electronic device 40. As such, the process may have additional steps that are not discussed. In addition, some steps may be optional, performed in a different order, or in parallel with each other. Accordingly, discussion of this process is illustrative and not intended to limit various embodiments of the invention.

The process 1000 begins at step 1002, which positions the charger 50 on a wireless charger 82. For example, a user may position the charger 50 on the wireless charger 82 so that the charger 50 may wirelessly receive and store power. The charger 50 may be positioned on the wireless charger 82 while it is coupled to another device 40.

The process then proceeds to step 1004, which wirelessly charges the charger 50. The next step 1006 in the process removes the charger 50 from the wireless charger 82. A user may take the charger 50 with them, and accordingly, the user has a mobile wireless charger 50 that may be used to charge a device 40 on the go when necessary. At step 1008, the charger 50 is positioned on the device 40 and provides power to the electronic device 40. As described previously, the device 40 may be a mobile phone, tablet, and/or power tool that is capable of receiving power wirelessly. The charger 50 may have a coupling portion configured to couple with the device. Additionally, in some embodiments, the charger 50 may be coupled to more than one device 40, 40b at a time.

The process may also proceed to step 1010, wherein the device 40 and the charger 50 are placed on the wireless charger 82. At step 1010, the wireless charger 82 provides power to the charger 50. The charger 50 may retain a portion of this power, as well as pass power to the mobile device 40. As described previously, in embodiments where the charger 50 is charged while it is coupled to the device 40, there are a number of schemes for how the charger 50 stores or transfers power. For example, in some embodiments, the charger 50 may store power until it reaches 50% of its battery capacity, after which the charger 50 wirelessly transfers power to the device 40. This is merely but one example, and a number of charging schemes may be used when the charger 50 is charging while coupled to the device 40.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, NVM, flash-memory, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Disclosed embodiments, or portions thereof, may be combined in ways not listed above and/or not explicitly claimed. In addition, embodiments disclosed herein may be suitably practiced, absent any element that is not specifically disclosed herein. Accordingly, the invention should not be viewed as being limited to the disclosed embodiments.

The embodiments of the invention described above are intended to be merely exemplary; numerous variations and modifications will be apparent to those skilled in the art. Such variations and modifications are intended to be within the scope of the present invention as defined by any of the appended claims.

What is claimed is:

1. A method of wirelessly charging a smartphone device, the method comprising:
    providing a smartphone device having a smartphone antenna configured to receive power wirelessly;
    providing a charging device having:
        a battery having a front surface and a back surface,
        a dual-mode antenna positioned in front of the front surface and closer to the front surface than the back surface, the dual-mode antenna configured to wirelessly transmit power and to wirelessly receive power,
        a housing surrounding the battery and the first antenna, the housing having a front contact surface and a rear surface,
        a coupling portion configured to couple the charging device with the smartphone device, the coupling portion being closer to the front contact surface than the rear surface,
        wherein the antenna is closer to the contact surface than the rear surface;
    charging the smartphone device by positioning the charging device relative to the smartphone device such that the antenna transmits power to the smartphone antenna.

2. The method as defined by claim 1, wherein positioning the charging device relative to the smartphone device comprises coupling the charging device to the smartphone device.

3. The method as defined by claim 2, wherein the positioning substantially aligns the antenna with the smartphone antenna.

4. The method as defined by claim 3, wherein coupling the charging device to the smartphone device comprises magnetically coupling the coupling portion with a corresponding coupling portion of the smartphone.

5. The method as defined by claim 1, wherein the charging device includes a second antenna closer to the back surface than the front surface, the second antenna comprising a wireless power receiver antenna or a dual-mode antenna, the second antenna configured to wirelessly receive power, wherein the second antenna is surrounded by the housing.

6. The method as defined by claim 5, further comprising simultaneously charging a second electronic device having a second device antenna by positioning the charging device relative to the second electronic device such that the second antenna transmits power to the second device antenna.

7. The method as defined by claim 1, further comprising uncoupling the charging device from the smartphone device.

8. The method as defined by claim 1, further comprising simultaneously charging the charging device from a grid-connected charger as the charging device charges the smartphone device.

9. The method as defined by claim 1, wherein the coupling portion comprises a magnet.

10. A charging device for wirelessly charging an electronic device having a wireless power receiver antenna, the charging device comprising:
a battery having a front surface and a back surface;
a first antenna positioned in front of the front surface, the first antenna comprising a dual-mode antenna, the first antenna configured to wirelessly transmit power and to wirelessly receive power;
a housing surrounding the battery, the first antenna, and a coupling portion,
the housing having a front contact surface and a rear surface, the coupling portion positioned in front of the front surface and configured to couple the charging device with the electronic device, the coupling portion being closer to the contact surface than the rear surface,
the first antenna being closer to the contact surface than the rear surface.

11. The charging device as defined by claim 10, wherein the rear surface is configured to couple with a second electronic device.

12. The charging device as defined by claim 10, wherein the charging device includes an electromechanical connection for receiving power.

13. The charging device as defined by claim 10, wherein the device has a tapered transition surface between the contact surface and the rear surface.

14. The charging device as defined by claim 10, further comprising a heat pipe coupled with the battery.

15. The charging device as defined by claim 10, wherein the coupling portion includes an adhesive, magnet, suction cup, and/or hook and loop fasteners.

16. The charging device as defined by claim 15, wherein the housing is imperforate.

17. The device of claim 10, wherein the coupling portion is configured to magnetically couple with a corresponding coupling portion of the smartphone so as to align the first antenna with a smartphone antenna configured to receive power wirelessly.

18. A system comprising:
a charging device having:
a device battery having a front surface and a back surface,
a front antenna closer to the front surface than the back surface of the device battery, the front antenna comprising a dual-mode antenna, the front antenna configured to wirelessly transmit power and to wirelessly receive power,
a charging device housing surrounding the device battery and the front antenna,
the charging device housing having a front contact surface and a rear surface, and
a smartphone coupling portion closer to the front contact surface than the rear surface of the housing, the smartphone coupling portion configured to magnetically couple the charging device with a corresponding coupling portion of a smartphone,
wherein the front antenna is closer to the front contact surface than the rear surface; and
a smartphone having a smartphone battery, the smartphone also having a smartphone antenna configured to receive power wirelessly, the smartphone battery and the smartphone antenna being within a smartphone housing, the smartphone housing having a smartphone surface nearest to the smartphone antenna, the smartphone having the corresponding coupling portion configured to magnetically couple with the coupling portion of the charging device.

19. The system of claim 18, further comprising:
a back antenna nearest to the back surface, the back antenna comprising a wireless power receiver antenna or a dual-mode antenna, the back antenna configured to wirelessly receive power,
the charging device housing also surrounding the back antenna, and
the back antenna being closer to the rear surface than the front contact surface.

20. The system of claim 18, wherein the coupling portion includes a magnet.

21. The system of claim 18, wherein the corresponding coupling portion comprises a magnetically attractive portion.

22. The system of claim 18, wherein the smartphone coupling portion is positioned between the device battery and the smartphone.

* * * * *